United States Patent
Feltgen

(10) Patent No.: US 9,303,817 B2
(45) Date of Patent: Apr. 5, 2016

(54) METHOD FOR THE AUTOMATED DISCHARGE OF CONDENSATE FROM A PRESSURIZED GAS SYSTEM

(75) Inventor: Martin Feltgen, Wuppertal (DE)

(73) Assignee: BEKO TECHNOLOGIES GMBH (DE)

( * ) Notice: Subject to any disclaimer, the term of this patent is extended or adjusted under 35 U.S.C. 154(b) by 13 days.

(21) Appl. No.: 14/343,742

(22) PCT Filed: Sep. 7, 2012

(86) PCT No.: PCT/EP2012/067487
§ 371 (c)(1),
(2), (4) Date: Mar. 7, 2014

(87) PCT Pub. No.: WO2013/034673
PCT Pub. Date: Mar. 14, 2013

(65) Prior Publication Data
US 2014/0224339 A1 Aug. 14, 2014

(30) Foreign Application Priority Data
Sep. 8, 2011 (DE) .......................... 10 2011 053 410

(51) Int. Cl.
*F16T 1/00* (2006.01)
*F16T 1/38* (2006.01)
(Continued)

(52) U.S. Cl.
CPC . *F16T 1/38* (2013.01); *F04B 39/16* (2013.01); *F16T 1/48* (2013.01); *Y10T 137/0318* (2015.04); *Y10T 137/3052* (2015.04)

(58) Field of Classification Search
CPC ............... G05D 9/12; F16T 1/00; F16T 1/38; F16T 1/48; F04B 39/16; Y10T 137/3052; Y10T 137/3102; Y10T 137/3105; Y10T 137/3143; Y10T 137/3146; Y10T 137/0318
USPC .......................... 137/187, 203, 204, 213, 214
See application file for complete search history.

(56) References Cited

U.S. PATENT DOCUMENTS 4,974,626 A * 12/1990 Koch .............................. 137/187
6,206,025 B1 * 3/2001 Koch et al. ..................... 137/187
(Continued)

FOREIGN PATENT DOCUMENTS

| DE | EP 0391250 B1 * | 3/1990 |
|---|---|---|
| DE | 19645815 A1 * | 7/1997 |
| GB | 2137349 A * | 10/1984 |

OTHER PUBLICATIONS

European Patent Office, Machine translation of EP0391250, Mar. 18, 2015 (Taken from Espacenet website on Mar. 18, 2015), all pages.*

*Primary Examiner* — Craig J Price
(74) *Attorney, Agent, or Firm* — Cantor Colburn LLP

(57) ABSTRACT

A method for a pressurized gas system includes: a collecting step wherein condensate is collected over a duration; a detection step terminating the collecting step and detecting condensate in a region with a sensor; a discharge step over a duration, where condensate is discharged if detected in the region. When condensate is first detected, the collecting duration of the subsequent collecting steps is shortened and/or the discharge duration of the following discharge steps is lengthened and/or a degree of opening of the drainage valve in the following discharge steps is increased. When condensate is not detected, the collecting duration of the following collecting steps is lengthened and/or the discharge duration of the following discharge steps is shortened and/or a degree of opening of the drainage valve in the following discharge steps is decreased.

11 Claims, 2 Drawing Sheets

(51) Int. Cl.
   *F04B 39/16*      (2006.01)
   *F16T 1/48*       (2006.01)

(56)         References Cited

U.S. PATENT DOCUMENTS 6,276,894 B1 *  8/2001  Koch ........................ 137/204

2007/0001019 A1 *  1/2007  Sinstedten ................... 137/183
   2014/0130898 A1 *  5/2014  Schlensker et al. ........... 137/314
   2014/0150891 A1 *  6/2014  Schlensker .................. 137/197
   2014/0202559 A1 *  7/2014  Feltgen et al. .............. 137/395
   2014/0230905 A1 *  8/2014  Sinstedten et al. ........... 137/1

* cited by examiner

METHOD FOR THE AUTOMATED DISCHARGE OF CONDENSATE FROM A PRESSURIZED GAS SYSTEM

FIELD

The disclosure relates to a method for the automated discharge of condensate from a pressurized gas system by means of a condensate drainage means and a condensate drainage means with a correspondingly equipped electronic control and monitoring system.

BACKGROUND

Condensate, which substantially consists of water and oil, and which stems from the lubricants of the compressors and the moisture content of the gas, for example, is produced in pressurized gas systems, such as pressurized air systems. Generally, this condensate affects the intended use of the pressurized gas system through dirt, clogging and corrosion. Therefore, it has to be collected and discharged from time to time from the pressurized gas system, which is closed as such, without larger amounts of gas or pressurized air being lost and the pressure in the system dropping significantly, if possible.

Carrying out such discharging processes in strictly pre-defined time intervals is known. This course of action, which not controlled by any requirements, is disadvantageous in that the above-mentioned pressure losses may possibly, and among other things, occur, caused by unnecessary discharging processes. Ideally, the filling level is monitored quantitatively and continuously in order to control the discharging process depending on the filling level, both with regard to its duration as well as with regard to its timing. As regards the quantitative filling level measurement, the use of condensate drainage means equipped with floats is known, there being a danger of an occurrence of agglutination, so that the condensate can no longer be discharged or that pressurized gas losses occur as a result of this, due to unnecessary release of the pressurized gas. Therefore, it is also known to monitor the filling level indirectly, for example by means of a capacitive measurement.

Thus, a quantitative measurement is technically possible, although complicated. However, there are problems with the discharging process because turbulences in the backed-up pressurized condensate have to be avoided in order to enable a reliable filling level measurement at all. Particularly in the case of the generally small-volume collecting regions of conventional condensate drainage means, this is impossible. In other words, filling level monitoring during the discharging process is generally "blind".

SUMMARY

The present disclosure provides a method for the automated discharge of condensate from a pressurized gas system by means of a condensate drainage means, in which a reliable automated condensate discharge, which avoids unnecessary pressure loss to a large extent, by means of a condensate drainage means is ensured. Moreover, a condensate drainage means improved accordingly is provided. This is achieved by means of a method with the features of claim 1, as well as by a condensate drainage means according to the independent claim. The features cited individually can be combined in any technologically meaningful manner and present other embodiments of the invention. The description, in particular in connection with the figures, additionally characterizes and specifies the invention.

The method according to the disclosure is intended for the automated discharge of condensate from a pressurized gas system, preferably from a pressurized air system, by means of a condensate drainage means, wherein the latter comprises a collecting region for the condensate, a sensor for monitoring the filling level of the condensate in the collecting region, and a controllable discharge valve for discharging the condensate from the collecting region.

The method according to the disclosure is suitable in principle for any type of filling level sensor system, for example also a quantitative sensor system, i.e. a system capable of detecting the filling level continuously over all possible filling levels in the collecting region. Such a detection, which was described above, is complex; preferably, it is a detection that detects the singular reaching of a predefined filling level, for example a predefined maximum filling level. Such a sensor system is inexpensive to realize and comparatively reliable. Preferably, the filling level is determined by capacitive measurement.

The method according to the disclosure includes a repeating time sequence, three steps, which are discussed in more detail below.

A collecting step in which the condensate is collected over a predefined collecting duration in the collecting region of the condensate drainage means.

A detection step, which completes the collecting step, is also provided. "Completing" means that the point in time of the detection step determining whether or not condensate is present in the collecting region defines the collecting duration of the current collecting step. According to the disclosure, this point in time is crucial for the definition of the collecting duration; a continuous running measurement and thus monitoring of the filling level may be provided prior thereto. If no condensate or no sufficient condensate filling level is detected at that point in time, no discharge step takes place, is thus skipped, and a new collecting step is carried out immediately.

Moreover, a discharge step is provided in which condensate is discharged from the collecting region of the condensate drainage means for a predefined discharge duration by opening the discharge valve, provided condensate was detected in the collecting region in the preceding detection step. The "positive" decision in the detection step thus triggers the discharge step. A possible delay in time between the detection and the discharge would have to be added to the defined collecting duration in order to determine the total collecting time.

It is provided according to the disclosure that for the case in which condensate is detected for the first time or at the latest repeatedly in the detection step, the collecting duration of at least one of the subsequent collecting steps, preferably of the next collecting step, is shortened and/or the discharge duration of at least one of the subsequent discharge steps, preferably of the next discharge step, is extended in time and/or a degree of opening of the discharge valve in at least one of the subsequent discharge steps, preferably of the next discharge step, is increased, and that for the case in which no condensate is detected for the first time or repeatedly in the collecting region, the collecting duration of at least one of the subsequent collecting steps, preferably of the next collecting step, is extended and/or the discharge duration of at least one of the subsequent discharge steps, preferably of the next discharge step, is shortened in time and/or a degree of opening of the discharge valve in at least one of the subsequent discharge steps, preferably of the next discharge step, is reduced. The terms "shorten", "reduce" or "extend", "increase" in this case respectively relate to the altered current step as compared to the corresponding step that is precedent in time.

Thus, the method is advantageous in that, despite the near impossibility of monitoring the filling level during the discharging process, it results in a discharge that is optimized at least roughly with regard to the duration, the volume and/or the point in time, and in which unnecessary discharging processes, i.e. discharging processes without the discharge of condensate, are largely avoided by at least one of the aforementioned discharge parameters being varied in a shrewd manner. With this arrangement it is accomplished that, on the one hand, as little condensate as possible per cycle is collected compared with the average feed volume, and, on the other hand, this is accomplished with as few discharge steps as possible, in order to keep the wear of the discharge valve caused by the opening and closing movement as low as possible by collecting as much condensate as possible within the available collecting region per discharging process (optionally also above the level assigned in the detection step), but without any overflow into upstream regions or containers of the pressurized gas system.

It is the responsibility of the person skilled in the art to choose the respective measure of variation in time according to the structural conditions of the condensate drainage means or the pressurized gas system, possibly after a few practical tests. The method according to the disclosure is suitable for condensate drainage means with various volumes of the collecting region from 1 ml to some tens of liters, such as 15 ml to 40 liters.

According to another embodiment of the method according to the disclosure, in the case of a first repetition—this means a direct, immediate repetition—of the detection of condensate in the collecting region, only the collecting duration is shortened in the next collecting step. Preferably, in order to be able to react to an abrupt rise of the condensate, however, already in the case of a first detection of condensate, the collecting time is preferably shortened in the subsequent collecting step as compared to the preceding collecting step. By limiting the variation to only the collecting duration, a "moderate" intervention as regards the necessity of a condensate discharge is realized. Since greater pressure losses in the pressurized gas system result in great pressure fluctuations in the pressurized gas system, shorter intervals between the condensate discharge processes, at least as a first reaction to a detection of condensate, are preferred.

In the case of another repetition, both the interval in time is shortened and the discharge duration is extended in time, for example. The extension of the discharge duration also has a cleansing flushing effect in addition to the faster evacuation of the condensate.

Accordingly, the collecting duration is extended and the discharge duration in the next discharge step shortened in the case of a first non-detection of condensate in the collecting region. In the case of another repetition of the non-detection, the interval in time is extended and the discharge duration is shortened in time, for example, in order to minimize the drop in pressure.

In order to improve the efficiency of maintenance work, it is provided, according to another embodiment of the method according to the disclosure, that a visual or acoustic alarm signal is generated if the detection of condensate in the collecting region is repeated more than twice.

Even if, according to the disclosure, the detection step precedes the discharging process in time and if, at least at the beginning of the discharging process, it is to be avoided due to turbulences, another filling level measurement step is not excluded in principle, according to the disclosure, even during the discharging process. For example, another sensor for the detection of a minimum filling level being reached during discharging can be provided in order to monitor the execution of the discharging process, for example.

According to a preferred embodiment of the method according to the disclosure it is provided that, during the collecting step, at least one further measuring step for monitoring the filling level is provided during the collecting step. This measuring step is provided, for example, in order to check the function of the filling level sensor system by means of a plausibility check. For example, another sensor assigned to a medium or a minimum filling level is provided. In a plausibility check, the detection of the reaching of the maximum filling level would require as a measuring result the reaching of the medium or minimum filling level. In case of a contradictory result, an acoustic or visual error or alarm indication would be generated, for example.

Moreover, the speed of the filling level increase can be estimated by means of this at least one measuring step. For example, this serves for generating an acoustic or visual error or alarm indication in the case of a rapid condensate feed.

In another advantageous embodiment of the method according to the disclosure, the result of the speed estimate pertaining to the filling level increase serves for establishing the respective measure of change of the collecting duration, the discharge duration and/or the degree of opening. That is, particularly in the case of greatly fluctuating condensate feed flows, this estimate serves for varying the measure of the change in the respective shortening or extension of the collecting duration and/or discharge duration and/or reduction or increase of the degree of opening. For example, the speed is determined by means of the time between the completion of the discharge step and the reaching of the medium or minimum filling level in the measuring step.

The disclosure moreover relates to a condensate drainage means for a pressurized gas system comprising a collecting region for the condensate, a sensor for monitoring the filling level of the condensate in the collecting region, a controllable discharge valve for discharging the condensate from the collecting region, and an electronic controlling and monitoring circuit, the latter being configured to carry out the method in one of the previously described embodiments that are provided with the respective advantages.

In order to reduce the susceptibility to failure, it is provided, according to an advantageous embodiment, that the discharge valve is controlled by pressurized gas and the condensate drainage means moreover comprises an electromagnetically operating control valve, so that a controlled opening and closing of the discharge valve is caused by means of the pressurized gas, by the discharge valve being put under pressure for closing, for example.

Preferably, a diaphragm valve is used as the discharge valve because it has proved particularly unsusceptible to failure.

BRIEF DESCRIPTION OF THE FIGURES

The disclosure as well as the technical environment are explained below in more detail with reference to the figures. It is to be noted that the Figures depict a particularly preferred embodiment of the disclosure, but that it is not limited thereto. The Figures schematically show.

DETAILED DESCRIPTION

Figure 1:
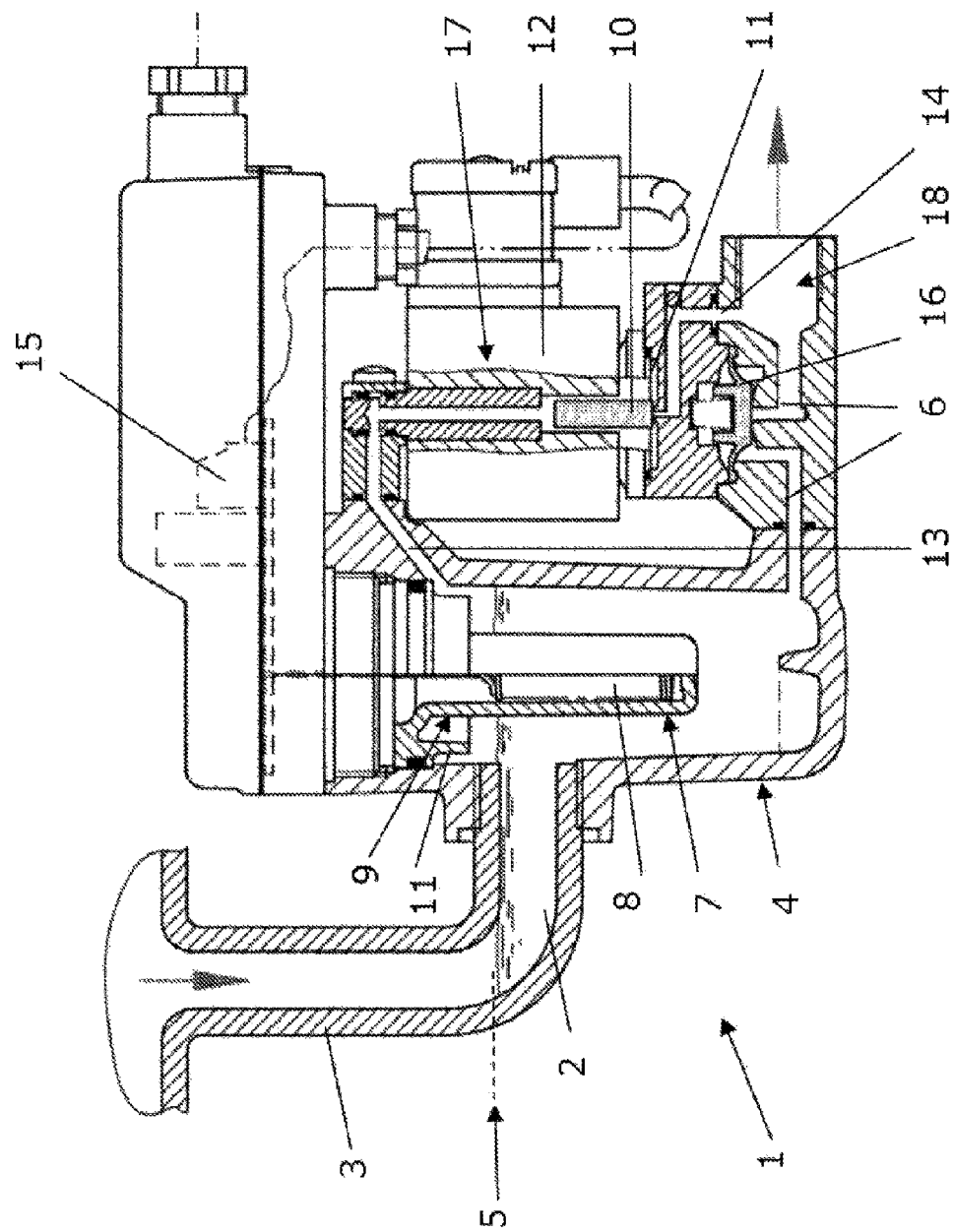
FIG. 1: a sectional view of a generic condensate drainage means in which the method according to the disclosure is applied.

FIG. 1 shows a condensate drainage means 1 for a pressurized air system in a sectional view. Condensate 2 accumulating during the compression of the pressurized air is fed via a feed pipe 3 to the condensate drainage means 1. Substantially, the condensate 2 is condensated moisture of the ambient air sucked in by an air compressor, which is not shown here. Moreover, it generally contains oily and particulate metallic constituents.

The condensate 2 collects in a condensate collecting region 4 and, after reaching a defined filling level 5, is discharged via a discharge valve 16 provided in the discharge pipe 6 and the discharge port 18. In the embodiment shown in FIG. 1, the discharge valve 16 is configured as a diaphragm valve.

A capacitive sensor system 7 for quantitatively measuring the filling level in the condensate collecting region 4 is provided. The sensor system 7 comprises at least one measuring capacitor 8 having a capacity that changes continuously depending on the filling level of the condensate 2 in the condensate collecting region 4. The capacitive measurement thus detects the filling state of the condensate collecting region 4 by means of the change of the electrical capacitance if condensate 2 as a dielectric is supplied. The measuring capacitor 8 forms an electromagnetic measuring field between a first capacitor electrode formed in a dedicated manner and a second counter-electrode provided by the wall of the condensate collecting region 4. Even in the case of a large extent of contamination, for example due to rust from the pressurized air pipes or oil from the air compressors, the device shown is very reliable. The sensor 7 is disposed in such a manner that, even in the case of a flooded condensate collecting region 4, a zone 9 remains that is not wetted by the condensate and is thus clean, in order to avoid faulty measurements that are caused by, for example, deposits that may result in a measuring short circuit. In an embodiment that is not shown, the sensor system 7 may also comprise another sensor which, for example within the context of another measuring step, detects the reaching of a minimum volume of the collecting region 4. The sensor is provided, for example, in the lower region of the collecting region 4.

The clean zone 9 is defined by a diving bell-like recess 11. If the collecting region 4 is fully flooded—i.e. above the maximum filling level 5 provided—no condensate 2 can enter the clean zone 9 or the diving bell-like recess 11. The inlet of the pressurized air line 13 is also provided in the clean zone 9 above the maximum filling level 5 provided. The pressurized air branched off therethrough serves for actuating the discharge valve 16 of for keeping the discharge valve in its closed position. The electromagnetic valve 17 is provided for this purpose, which in the position shown ensures that pressurized air abuts on the diaphragm of the discharge valve 16 in such a way that the discharge pipe 6 is closed and no condensate 2 can be discharged. The electromagnetic valve 17 comprises a coil 12 and a permanent-magnet armature 10, which is moved by a control current flowing through the coil from a rest position, for example the position corresponding to the closed position of the discharge valve 16 shown in FIG. 1, into a desired position. The rest position is a result of the fact that the armature 10 has at one of its end faces an elastic sealing material and, when the end face abuts against a valve seat 11 aided by gravity and pressurized air, the pressurized air discharge pipe 14 is caused to be closed, so that the pressurization of the discharge valve 16 is maintained. In order to control the electromagnetic valve 17, an electronic control and monitoring circuit 15 is provided.

Figure 2:
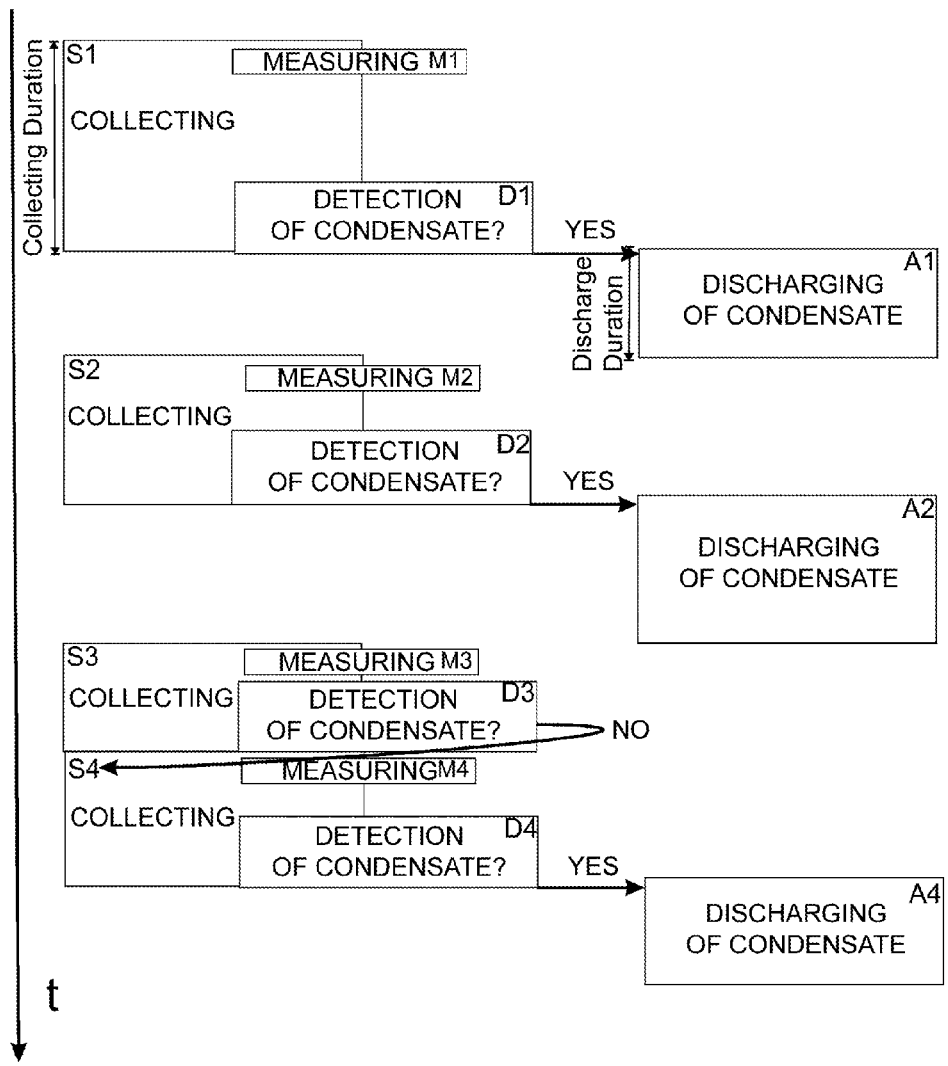
FIG. 2: a schematic flow diagram associated therewith.

The circuit is designed to carry out the method steps according to the disclosure in the sequence in time which is shown in FIG. 2 in an exemplary, only partial manner, in the direction of the arrow designated t. These are the collecting steps S1 to S4, the detection steps D1 to D4 and the discharge steps A1, A2 and A4 according to the disclosure. Furthermore, measuring steps carried out during the collecting steps are also provided. The extent of the steps S1 to S4 in the direction of the time arrow t indicates the respective collecting duration. The extent of the steps A1, A2 and A4 in the direction of the time arrow t indicates the respective discharge duration. No detection step takes place during the discharge steps A1, A2 and A4.

Upon completion of the collecting step S1, it is detected in the detection step D1 whether the maximum filling level 5 has been reached. Since the sensor system signals a reaching of the filling level, the discharge valve 16 is opened for a discharge duration in the discharge step A1 in order to discharge condensate. After the discharge duration has expired, the discharge valve 16 is closed. The collecting step S2 begins. Since condensate was detected beforehand, its collecting duration is shortened. This immediate reaction to a detection of condensate ensures that condensate is discharged very early in order to avoid a possibly flood-like back-up. The collecting step S2 is again completed with a detection step D2. Again, a reaching of the maximum filling level is detected in step D2, which results in, on the one hand, a discharge step A2 with an extended discharge duration compared with the previous discharge step being carried out and, on the other hand, the collecting step S3, which in turn follows the discharge step A2, having a shortened collecting duration compared with the previous collecting step S2. When its collecting duration expires, a detection step D3 is carried out. Since the result of that is that no condensate is present, or at least that the predefined filling level has not been reached, no discharge step A3 is carried out, but the process is continued with a new collecting step S4, whose collecting duration is extended compared with the previous collecting step S3. After its extended collecting duration, this collecting step S4 ends with a detection step D4, which detects the necessity of a discharge step A4. The discharge duration of that is shortened compared to the previous discharge step A2 due to the intermediate result of the detection step D3. This automatic discharging method can proceed continuously, with the sequence shown being only exemplary. The measuring steps M1 to M4 provided during the collecting steps S1 to S4 serve for monitoring the collecting behavior during the collecting steps S1 to S4. The measuring step M1 to M4 is in this case respectively the result of the reaching of the medium or minimum level and in each case defines a duration between the completion and the reaching of the medium or minimum filling level. This duration makes it possible to estimate the filling behavior and affects the measure of change within which the collecting duration and the discharge duration are changed at least in the respectively subsequent collecting or discharge step. Moreover, the measuring step serves for monitoring the function.

The invention claimed is:

1. A method for automated discharge of a condensate from a pressurized gas system by means of a condensate drainage component, wherein the condensate drainage component comprises a collecting region for the condensate, a sensor for the detection of the condensate in the collecting region, and a controllable discharge valve for discharging the condensate from the collecting region, the method including the following steps in a repeating time sequence:
    a collecting step in which the condensate is collected over a predefined collecting duration;
    a detection step that at least completes the collecting step in order to detect the condensate in the collecting region by means of the sensor;

a discharge step in which the condensate is discharged for a predefined discharge duration, provided the condensate was detected in the collecting region in the detection step;

wherein for a case in which the condensate is first detected or repeatedly detected in the detection step, the collecting duration of at least one of the subsequent collecting steps is shortened and/or the discharge duration of at least one of the subsequent discharge steps is extended in time and/or a degree of opening of the discharge valve in at least one of the subsequent discharge steps is increased, and that, when the condensate is not detected or the condensate is repeatedly detected in the collecting region, the collecting duration of at least one of the subsequent collecting steps is extended and/or the discharge duration of at least one of the subsequent discharge steps is shortened in time and/or a degree of opening of the discharge valve in at least one of the subsequent discharge steps is reduced.

2. The method for controlling the condensate drainage component in the pressurized gas system according to claim 1, wherein after the condensate is first detected in the collecting region in the detection step, only the collecting duration for the next collecting step is shortened.

3. The method for controlling the condensate drainage component in the pressurized gas system according to claim 1, wherein in case of a first non-detection of condensate in the collecting region in the detection step, the collecting duration for the next collecting step is extended and the discharge duration for the next discharge step is shortened.

4. The method for controlling the condensate drainage component in the pressurized gas system according to claim 1, wherein in case of a multiple repetition of the detection of condensate in the collecting region in the detection step, a visual or an acoustic alarm signal is generated.

5. The method for controlling the condensate drainage component in the pressurized gas system according to claim 1, wherein in the detection step, the case of the detection of condensate is triggered by exceeding a predefined filling state.

6. The method for controlling the condensate drainage component in the pressurized gas system according to claim 1, wherein at least one further measuring step for monitoring the filling level is provided during the collecting step.

7. The method for controlling the condensate drainage component in the pressurized gas system according to claim 1, characterized in that the speed of a filling level increase is estimated by means of at least one measuring step, and that the respective measure of change of the collecting duration, the discharge duration and/or the degree of opening is established by means of this estimate.

8. The condensate drainage component for the pressurized gas system, comprising the collecting region for the condensate, the sensor for monitoring the filling level of the condensate in the collecting region, the controllable discharge valve for discharging the condensate from the collecting region, and an electronic controlling and monitoring circuit, which is configured to carry out the method according to claim 1.

9. The condensate drainage component according to claim 8, wherein the discharge valve is controlled by pressurized gas and the condensate drainage component further includes an electromagnetically operating control valve wherein a controlled opening and closing of the discharge valve is caused by means of the pressurized gas.

10. The condensate drainage component according to claim 8, wherein the discharge valve is a diaphragm valve.

11. Use of the condensate drainage component according to claim 8 wherein the pressurized gas system is a pressurized air system.

* * * * *